(12) United States Patent  (10) Patent No.: US 12,020,659 B2
Zhou et al.  (45) Date of Patent: Jun. 25, 2024

(54) IMAGE DISPLAY METHOD AND DISPLAY DEVICE

(71) Applicant: HKC Corporation Limited, Guangdong (CN)

(72) Inventors: Mancheng Zhou, Guangdong (CN); Haijiang Yuan, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/090,811

(22) Filed: Dec. 29, 2022

(65) Prior Publication Data

US 2023/0343301 A1  Oct. 26, 2023

(30) Foreign Application Priority Data

Apr. 20, 2022  (CN) .......................... 202210415671.9

(51) Int. Cl.
  *G09G 3/34*  (2006.01)
  *G02F 1/1368*  (2006.01)
  *G02F 1/167*  (2019.01)
  *G02F 1/1676*  (2019.01)
  *G02F 1/1685*  (2019.01)
  *G09G 3/20*  (2006.01)

(52) U.S. Cl.
  CPC .......... *G09G 3/344* (2013.01); *G09G 3/2007* (2013.01); *G02F 1/1368* (2013.01); *G02F 1/167* (2013.01); *G02F 1/1676* (2019.01); *G02F 1/1685* (2019.01); *G09G 2310/0254* (2013.01); *G09G 2320/0257* (2013.01)

(58) Field of Classification Search
  CPC ............. G09G 3/344; G09G 2310/068; G09G 2320/0257
  See application file for complete search history.

(56) References Cited

U.S. PATENT DOCUMENTS

2005/0179641 A1  8/2005  Zhou et al.
2008/0094315 A1*  4/2008  Johnson ................. G09G 3/344
                                                              345/107

(Continued)

FOREIGN PATENT DOCUMENTS

CN  1742312 A  3/2006
CN  1791900 A  6/2006

(Continued)

*Primary Examiner* — Priyank J Shah
(74) *Attorney, Agent, or Firm* — Scully, Scott, Murphy & Presser, P.C.

(57) ABSTRACT

An image display method and a display device are provided. The driving module is coupled with multiple pixel units in the display panel and provides a driving voltage according to display data to define an electric field to display an image. For each of the multiple pixel units, an image is displayed under an electric field defined by a first driving voltage corresponding to first display data during a display period of a first frame image. Reset data is output by the driving module to said each of the multiple pixel units. A reset voltage corresponding to the reset data provides an electric field for said each of the multiple pixel units. An image is displayed under an electric field defined by a second driving voltage corresponding to second display data during a display period of a second frame image.

19 Claims, 6 Drawing Sheets

(56) References Cited

U.S. PATENT DOCUMENTS

2010/0295880 A1* 11/2010 Sprague ................ G09G 3/344
    345/690
2012/0188295 A1* 7/2012 Joo .......................... G02F 1/17
    345/690
2012/0223928 A1    9/2012 Lim et al.

FOREIGN PATENT DOCUMENTS

| | | |
|---|---|---|
| CN | 1882979 A | 12/2006 |
| CN | 101063785 A | 10/2007 |
| CN | 102097057 A | 6/2011 |
| CN | 102376263 A | 3/2012 |
| KR | 10-2008-0079383 A | 9/2008 |
| TW | 200847092 A | 12/2008 |

* cited by examiner

IMAGE DISPLAY METHOD AND DISPLAY DEVICE

CROSS-REFERENCE TO RELATED APPLICATIONS

This application claims priority under 35 U.S.C. § 119(a) to Chinese Patent Application No. 202210415671.9, filed Apr. 20, 2022, the entire disclosure of which is incorporated herein by reference.

TECHNICAL FIELD

This disclosure relates to the field of display technology, and in particular to an image display method and a display device.

BACKGROUND

Electronic ink (e.g., Electronic Paper Display (EPD)) technology is new display technology with the help of ambient lights. According to a principle of the EPD technology, black particles and white particles which are charged are encapsulated in a micro-capsule structure, and the black particles and the white particles with different charges are moved up and down under the control of an externally-applied electric field, such that a black-and-white display effect is presented. Under an action of the electric field, black ink drops and white ink drops keep moving. When the white ink drops rise to an upper surface, the ambient lights incident on the upper surface are reflected completely, such that a white state is presented. The black ink drops and the white ink drops are mixed in proportion to form different colors with black, white, and grayscales.

However, due to a bistable effect (a hysteresis effect) of the EPD technology, a present reset system is unable to completely reset the black ink drops and the white ink drops, thereby resulting in an afterimage phenomenon.

SUMMARY

An image display method is provided in an implementation of the present disclosure, and is applicable to a display panel and a driving module. The display panel includes multiple pixel units. Each of the multiple pixel units includes at least one micro liquid capsule. Each of the at least one micro liquid capsule displays a black-and-white grayscale under an action of an electric field. The driving module is coupled with the multiple pixel units and provides a driving voltage according to display data to define the electric field to display an image. The method includes the following. For said each of the multiple pixel units, an image is displayed under an electric field defined by a first driving voltage corresponding to first display data during a display period of a first frame image. Reset data is output by the driving module to said each of the multiple pixel units after the first frame image is displayed. A reset voltage corresponding to the reset data provides an electric field for said each of the multiple pixel units to reset. The reset voltage has a polarity opposite to the first driving voltage. For said each of the multiple pixel units, an image is displayed under an electric field defined by a second driving voltage corresponding to second display data during a display period of a second frame image.

A display device is further provided in the present disclosure. The display device includes a display panel and a driving module. The display panel includes multiple pixel units. Each of the multiple pixel units includes at least one micro liquid capsule. Said each of the multiple pixel units is configured to display a black-and-white grayscale under an action of an electric field. Said each of the multiple pixel units is configured to display an image under an electric field defined by a first driving voltage corresponding to first display data during a display period of a first frame image, and display an image under an electric field defined by a second driving voltage corresponding to second display data during a display period of a second frame image. The driving module is coupled with the multiple pixel units. The driving module is configured to provide a driving voltage according to display data to define the electric field to display an image, and output reset data to said each of the plurality of pixel units after the first frame image is displayed. A reset voltage corresponding to the reset data provides an electric field for said each of the plurality of pixel units to reset. The reset voltage has a polarity opposite to the first driving voltage.

BRIEF DESCRIPTION OF THE DRAWINGS

In order to explain technical solutions in implementations of the present disclosure more clearly, the following will give a brief introduction to accompanying drawings which are needed to be used in implementations. Apparently, the accompanying drawings in the following description are merely some implementations of the present disclosure. For those skilled in the art, other accompanying drawings can be obtained according to these accompanying drawings without creative efforts.

DETAILED DESCRIPTION

Figure 1:
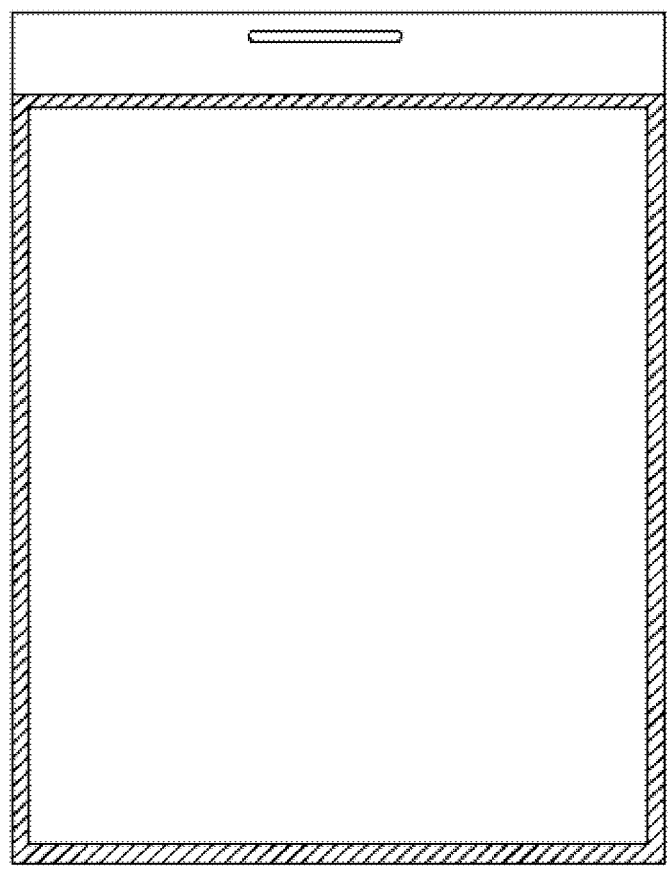
FIG. 1 is a schematic structural diagram of a display device provided in implementations of the present disclosure.

In order to facilitate understanding of the present disclosure, a comprehensive description will be given below with reference to related accompanying drawings. The accompanying drawings illustrate some exemplary implementations of the present disclosure. However, the present disclosure can be implemented in many different forms and is not limited to implementations described herein. On the contrary, these implementations are provided for a more thorough and comprehensive understanding of the present disclosure.

The following implementations are described with reference to accompanying drawings to illustrate particular implementations in which the present disclosure may be implemented. The serial numbers assigned herein for the components themselves, such as "first", "second", etc., are only used to distinguish between objects described and do not have any sequential or technical meaning. The "connection" and "coupling" in the present disclosure, unless otherwise specified, include direct and indirect connection (coupling). Direction terms mentioned in the present disclosure, such as "up", "down", "front", "back", "left", "right", "inside", "outside", "side surface", etc., are only directions with reference to the directions of the accompanying drawings. Therefore, the direction terms are used for better and clearer illustration and understanding of the present disclosure, and are not intended to indicate or imply that the device or component must have a specific orientation, be constructed and operated in the particular orientation, and therefore cannot be construed as limiting to the present disclosure.

In the description of the present disclosure, it should be noted that unless otherwise expressly specified or defined, terms such as "disposed", "arranged", "provided with", "mount", "couple", and "connect" should be understood broadly, and for example, a fixed connection, or a detachable connection, or an integrated connection; may be a mechanical connection; and may be a direct connection, or an indirect connection via an intermediate medium, or may be an internal communication between two components. The specific meanings of the above-mentioned terms in the present disclosure could be understood by those of ordinary skill in the art according to specific situations. It should be noted that the terms "first", "second", etc. in the specification, claims and accompanying drawings of the present disclosure are used to distinguish different objects, rather than to describe a specific order.

In addition, terms "comprise", "may comprise", "include", or "may include" used in the present disclosure indicate the existence of corresponding functions, operations, components, etc., which are disclosed, and do not limit one or more other functions, operations, components, etc. Moreover, the terms "comprise" or "include" indicate the existence of corresponding features, numbers, steps, operations, elements, components, or combinations thereof disclosed in the specification, and do not exclude the existence or addition of one or more other features, numbers, steps, operations, elements, components, or combinations thereof, with the intent of covering non-exclusive inclusion. Furthermore, when describing implementations of the present disclosure, "may" is used to mean "one or more implementations of the present disclosure". Also, the term "exemplary" is intended to refer to examples or illustrations.

Unless otherwise defined, all technical and scientific terms used herein have the same meaning as commonly understood by those skilled in the art of the present disclosure. The terms used herein in the specification of the present disclosure are for the purpose of describing specific implementations only and are not intended to limit the present disclosure.

In view of shortcomings in the above related art, an image display method with a relatively great display effect is provided in the present disclosure, which effectively solves an afterimage phenomenon.

An image display method is provided in an implementation of the present disclosure, and is applicable to a display panel and a driving module. The display panel includes multiple pixel units. Each of the multiple pixel units includes at least one micro liquid capsule. Each of the at least one micro liquid capsule displays a black-and-white grayscale under an action of an electric field. The driving module is coupled with the multiple pixel units and provides a driving voltage according to display data to define the electric field to display an image. The method includes the following. For said each of the multiple pixel units, an image is displayed under an electric field defined by a first driving voltage corresponding to first display data during a display period of a first frame image. Reset data is output by the driving module to said each of the multiple pixel units after the first frame image is displayed. A reset voltage corresponding to the reset data provides an electric field for said each of the multiple pixel units to reset. The reset voltage has a polarity opposite to the first driving voltage. For said each of the multiple pixel units, an image is displayed under an electric field defined by a second driving voltage corresponding to second display data during a display period of a second frame image.

Optionally, a color of the first display data and a color of the second display data are determined and compared by the driving module. A polarity of the reset voltage is adjusted by the driving module according to a comparison result.

Optionally, when said each of the multiple pixel units is driven by the electric field defined by the first driving voltage to display white, the reset voltage with a negative polarity is output by the driving module.

Optionally, a first reset voltage of the reset voltage is output by the driving module, where said each of the multiple pixel units is driven by the electric field defined by the first driving voltage to display white, and said each of the multiple pixel units is driven by the electric field defined by the second driving voltage corresponding to the second display data to display black. The at least one micro liquid capsule in said each of the multiple pixel units is driven by an electric field defined by the first reset voltage to display a grayscale ranging from zero grayscale to a first threshold grayscale. The first threshold grayscale is a highest grayscale for displaying black.

Optionally, a second reset voltage of the reset voltage is output by the driving module, where said each of the multiple pixel units is driven by the electric field defined by the first driving voltage to display white, and said each of the multiple pixel units is driven by the electric field defined by the second driving voltage corresponding to the second display data to display white. The at least one micro liquid capsule in said each of the multiple pixel units is driven by an electric field defined by the second reset voltage to display a grayscale of the first threshold grayscale.

Optionally, the reset voltage with a positive polarity is output by the driving module, where said each of the multiple pixel units is driven by the electric field defined by the first driving voltage to display black.

Optionally, a third reset voltage of the reset voltage is output by the driving module, where said each of the multiple pixel units is driven by the electric field defined by the first driving voltage to display black, and said each of the multiple pixel units is driven by the electric field defined by the second driving voltage corresponding to the second display data to display white. The at least one micro liquid capsule in said each of the multiple pixel units is driven by an electric field defined by the third reset voltage to display a grayscale ranging from zero grayscale to a second threshold grayscale. The second threshold grayscale is a highest grayscale for displaying white.

Optionally, a fourth reset voltage of the reset voltage is output by the driving module, where said each of the multiple pixel units is driven by the electric field defined by the first driving voltage to display black, and said each of the multiple pixel units is driven by the electric field defined by the second driving voltage corresponding to the second display data to display black. The at least one micro liquid capsule in said each of the multiple pixel units is driven by an electric field defined by the fourth reset voltage to display a grayscale of the second threshold grayscale.

Optionally, a direction of the electric field defined by the first driving voltage for said each of the multiple pixel units is opposite to a direction of the electric field defined by the reset voltage for said each of the multiple pixel units.

A display device is further provided in the present disclosure. The display device includes a display panel and a driving module. The display panel includes multiple pixel units. Each of the multiple pixel units includes at least one micro liquid capsule. Said each of the multiple pixel units is configured to display a black-and-white grayscale under an action of an electric field. Said each of the multiple pixel units is configured to display an image under an electric field defined by a first driving voltage corresponding to first display data during a display period of a first frame image, and display an image under an electric field defined by a second driving voltage corresponding to second display data during a display period of a second frame image. The driving module is coupled with the multiple pixel units. The driving module is configured to provide a driving voltage according to display data to define the electric field to display an image, and output reset data to said each of the plurality of pixel units after the first frame image is displayed. A reset voltage corresponding to the reset data provides an electric field for said each of the plurality of pixel units to reset. The reset voltage has a polarity opposite to the first driving voltage.

According to the image display method provided in the present disclosure, a corresponding reset voltage is output to drive said each of the multiple pixel units to reset in a display process of two consecutive frames of image, such that the afterimage phenomenon caused by a hysteresis effect is effectively avoided.

Reference can be made to FIG. 1, which is a schematic structural diagram of a display device 100 provided in implementations of the present disclosure. In implementations, the display device 100 may be a device using electronic inks to display.

Figure 2:
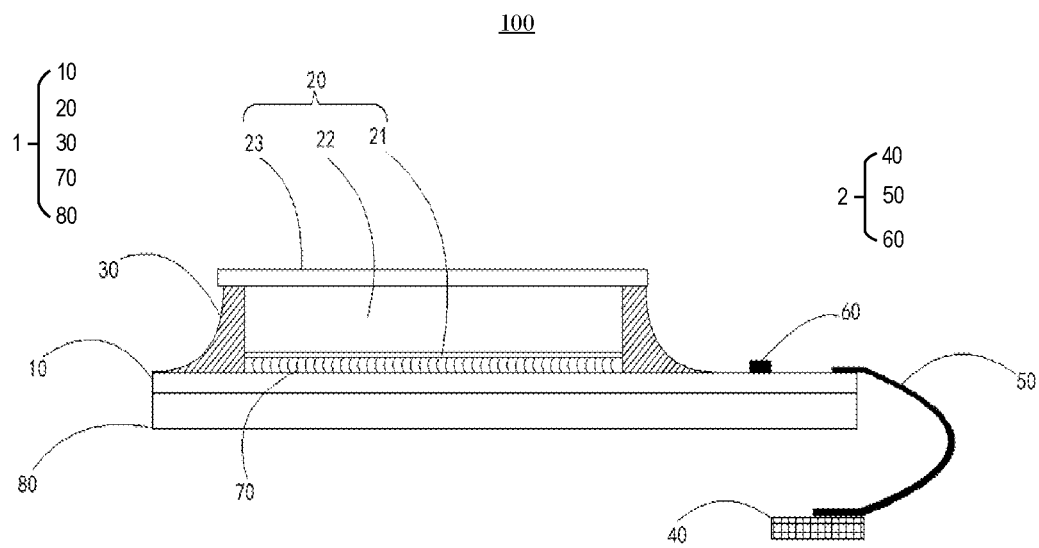
FIG. 2 is a schematic cross-sectional diagram of the display device in FIG. 1.

Specifically, reference can be made to FIG. 2, which is schematic cross-sectional diagram of the display device 100 in FIG. 1. As illustrated in FIG. 2, the display device 100 includes a display panel 1 and a driving module 2. The driving module 2 is configured to drive the display panel 1 to display an image according to image data.

The display panel 1 includes a substrate 10, an electronic paper film sheet 20, a sealant 30, a Thin Film Transistor (TFT) trace layer 70, and a support 80.

The substrate 10 is stacked at one side of the support 80. The TFT trace layer 70 is stacked at one side of the substrate 10 away from the support 80. The electronic paper film sheet 20 is stacked at one side of the TFT trace layer 70 away from the substrate 10. The sealant 30 is disposed at an edge of the electronic paper film sheet 20, and is configured to isolate water vapor in an environment from penetrating into the electronic paper film sheet 20. In implementations of the present disclosure, the sealant 30 may be an edge seal.

The electronic paper film sheet 20 includes a pixel electrode 21, an electronic ink 22, and a common electrode 23. The pixel electrode 21 is stacked at said one side of the TFT trace layer 70 away from the substrate 10. The common electrode 23 is disposed at a preset distance from one side of the pixel electrode 21 away from the TFT trace layer 70. The electronic ink 22 is filled between the common electrode 23 and the pixel electrode 21. The electronic ink 22 is composed of a large number of micro liquid capsules 22A (FIG. 3) with an extremely small size.

The driving module 2 includes a circuit driving board 40, a transmission board 50, and a driving unit 60. The circuit driving board 40 is disposed at one side of the support 80 away from the substrate 10. The driving unit 60 is disposed at the side of the substrate 10 away from the support 80. The transmission board 50 is a flexible circuit board. The circuit driving board 40 is connected with the driving unit 60 disposed at said one side of the substrate 10 away from the support 80 by bending, such that an electrical signal output by the circuit driving board 40 is transmitted to the driving unit 60 through the transmission board 50, and a pixel image is formed through the electronic paper film sheet 20 under the control of the driving unit 60. The driving unit 60 may be at least one driver chip.

Figure 3:
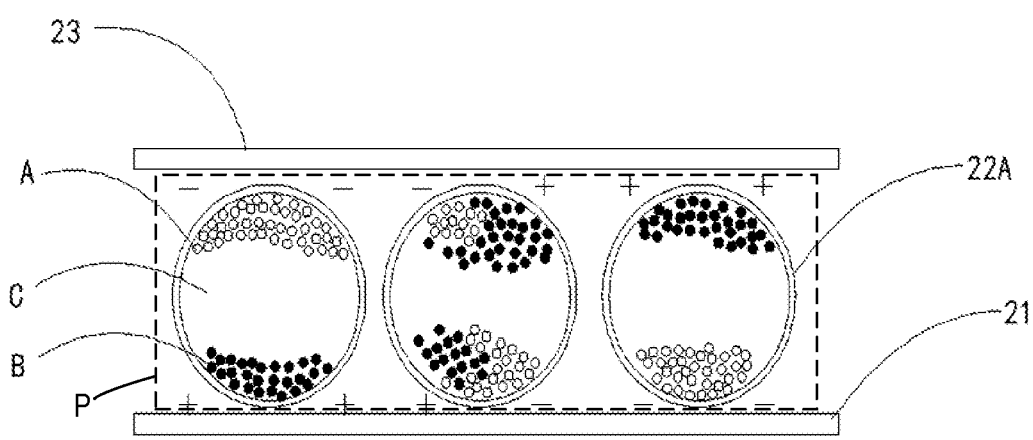
FIG. 3 is a schematic diagram illustrating an operation principle of an electronic paper film sheet in FIG. 2.

Reference can be made to FIG. 3, which is a schematic diagram illustrating an operation principle of an electronic paper film sheet in FIG. 2. As illustrated in FIG. 3, multiple micro liquid capsules 22A are disposed between the pixel electrode 21 and the common electrode 23. A micro liquid capsule 22A is a sealed sphere, and white particles A, black particles B, and transparent dispersion medium C are encapsulated inside the micro liquid capsule 22A. White particle A and black particle B are two kinds of particles with different charges. For example, white particle A is charged in positive and black particle B is charged in negative, or white particle A is charged in negative and black particle B is charged in positive. White particle A and black particle B are completely immersed in transparent dispersion medium C and can move freely in transparent dispersion medium C. When an electric field is defined at two ends of the micro liquid capsule 22A, white particle A charged in positive and black particle B charged in negative move correspondingly under an action of an electric field force, such that one side of each micro liquid capsule 22A close to the common electrode 23 will be in black or white to a certain extent. Finally, a certain image is formed together by all micro liquid capsules 22A at one side close to the common electrode 23.

Figure 4:
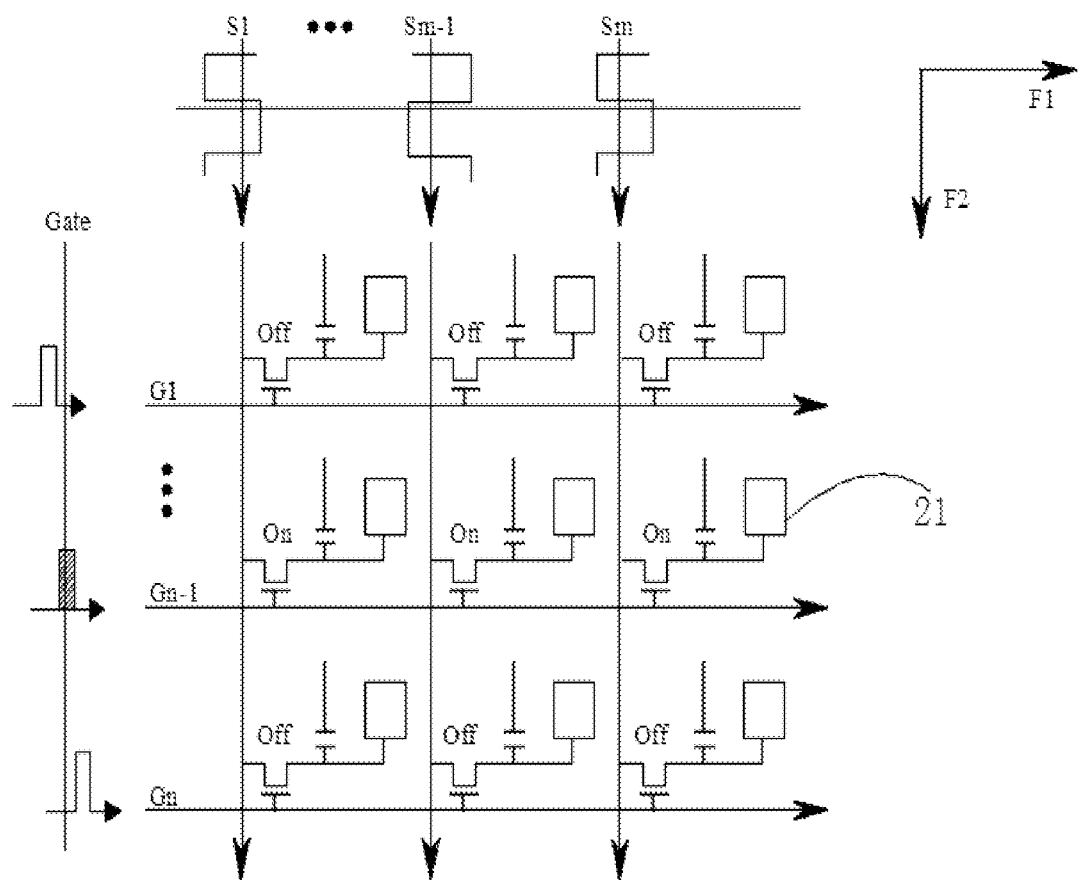
FIG. 4 is a schematic diagram illustrating a plane layout of a Thin Film Transistor (TFT) trace layer in FIG. 2.

Reference can be made to FIG. 4, which is a schematic diagram illustrating a plane layout of a TFT trace layer 70 in FIG. 2. As illustrated in FIG. 4, in the display panel 1, multiple pixel units P arranged in a matrix are defined by multiple scan lines (i.e., Gate line) G1~Gn extending in first direction F1 and multiple data lines (i.e., Source line) S1~Sm extending in second direction F2. Each pixel unit P is connected to a pixel electrode 21. Each pixel unit P includes a certain number of micro liquid capsules 22A, specifically, 1, 10, or 20 micro liquid capsules 22A, which can be set according to actual requirements, and is not limited in the present disclosure. In other words, at least one micro liquid capsule 22 constitutes a pixel unit P, the multiple pixel units P constitute the electronic ink 22 which is disposed between the pixel electrode 21 and the common electrode 22.

For example, regarding scan line in a first row G1, when scan line in the first row G1 is at high level, TFTs in the first row are turned on, and data signals are transmitted to pixel units P in the first row through data lines S1~Sm. Here, an electric field is defined between a pixel electrode 21 corresponding to each of pixel units P in the first row and a common electrode 23 corresponding to said each of pixel units P (FIG. 2), such that a color of a micro liquid capsule 22A corresponding to each of pixel electrodes 21 in the first row is changed under the control of the electric field. Specifically, under the action of an electric field force, white particles A charged in positive and black particles B charged in negative in the micro liquid capsule 22A move rapidly in transparent dispersion medium C. According to a specific direction of the electric field and a voltage difference between the pixel electrode 21 and the common electrode 23, the certain number of black particles and white particles in the micro liquid capsule 22A are controlled to move to one side of the micro liquid capsule 22A close to the common electrode 23, such that a certain grayscale is displayed, and finally a certain image displayed on the display panel 1.

After this frame image is refreshed, when scan lines G1~Gn are at a low level, all TFTs are turned off, and the electric field between the pixel electrodes 21 and the common electrode 23 disappears. However, due to a hysteresis effect of the electronic ink, the display panel 1 still keeps unchanged in a present image until data of the next frame image is input. In other words, the black particles and the white particles in the micro liquid capsule 22A still keep the previous state, and the micro liquid capsule 22A corresponding to the pixel electrode 21 still keeps unchanged in the previous grayscale.

Figure 5:
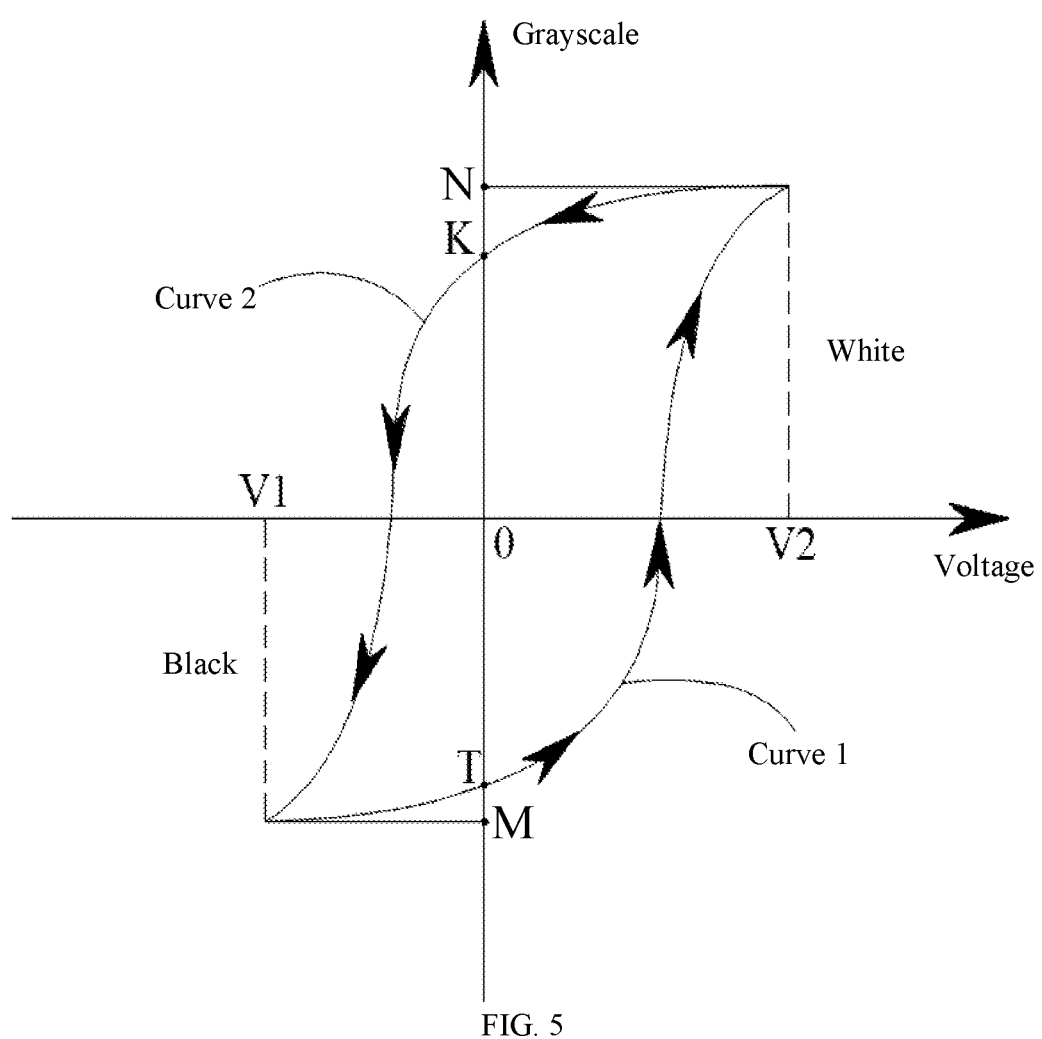
FIG. 5 is a schematic diagram of a curve of an electronic-ink grayscale changing along with a voltage.

Reference can be made to FIG. 5, which is a schematic diagram of a curve of an electronic-ink grayscale changing along with a voltage. As illustrated in FIG. 5, when a voltage of the pixel electrode 21 (FIG. 3) is first voltage V1, positive charges with colors and negative charges with colors in the micro liquid capsule 22A move under the action of the electric field force, such that the micro liquid capsule 22A is in black. When the voltage of the pixel electrode 21 is second voltage V2, the micro liquid capsule 22A is in white. First voltage V1 is a reverse voltage and second voltage V2 is a forward voltage. The micro liquid capsule 22A displays different grayscales according to a voltage from first voltage V1 to second voltage V2. Since a large number of micro particles with positive charges and negative charges exist in the micro liquid capsule 22A, the grayscale of the micro liquid capsule 22A changes differently when the micro liquid capsule 22A is subjected to electric field forces in different directions.

When a reverse voltage is applied to the micro liquid capsule 22A through the pixel electrode 21 and the common electric rod 23 from 0 to first voltage V1, the positive charges with colors and the negative charges with colors in the micro liquid capsule 22A move under the action of the electric field force, such that the micro liquid capsule 22A is in black. When first voltage V1 is applied across the micro liquid capsule 22A, a grayscale value of the micro liquid capsule 22A decreases following curve 2, and the micro liquid capsule 22A displays first threshold grayscale M, that is, black with the highest grayscale. Here, a voltage across the micro liquid capsule 22A is removed, that is, a voltage between the pixel electrode 21 and the common electrode 23 is removed, and a voltage value decreases from first voltage V1 to 0. Here, the grayscale value of the micro liquid capsule 22A follows curve 1, and the micro liquid capsule 22A still displays black with a grayscale of first stable grayscale T.

When a forward voltage is applied to the micro liquid capsule 22A through the pixel electrode 21 and the common electrode 23 from 0 to second voltage V2, the grayscale value of the micro liquid capsule 22A increases following curve 1, and the micro liquid capsule 22A is in white. When second voltage V2 is applied across the micro liquid capsule 22A, the grayscale value of the micro liquid capsule 22A increases following curve 1, and the micro liquid capsule 22A displays second threshold grayscale N, that is, white with the highest grayscale. Here, the voltage across the micro liquid capsule 22A is removed, that is, the voltage between the pixel electrode 21 and the common electrode 23 is removed, and the voltage value decreases from second voltage V2 to 0. Here, the grayscale value of the micro liquid capsule 22A follows curve 2, and the micro liquid capsule 22A still displays white with a grayscale of second stable grayscale K.

In a case where the micro liquid capsule 22A displays a previous frame image in black, and the micro liquid capsule 22A is required to display the next frame image in higher grayscale black, an initial grayscale value of the micro liquid capsule 22A is T, but the grayscale needs to change following curve 2, such that a grayscale corresponding to a voltage driven by a circuit is inaccurate, and a deviation will occur between a grayscale of black displayed by the micro liquid capsule 22A and a preset grayscale, thereby resulting in an afterimage phenomenon when the next frame image is displayed.

Figure 6:
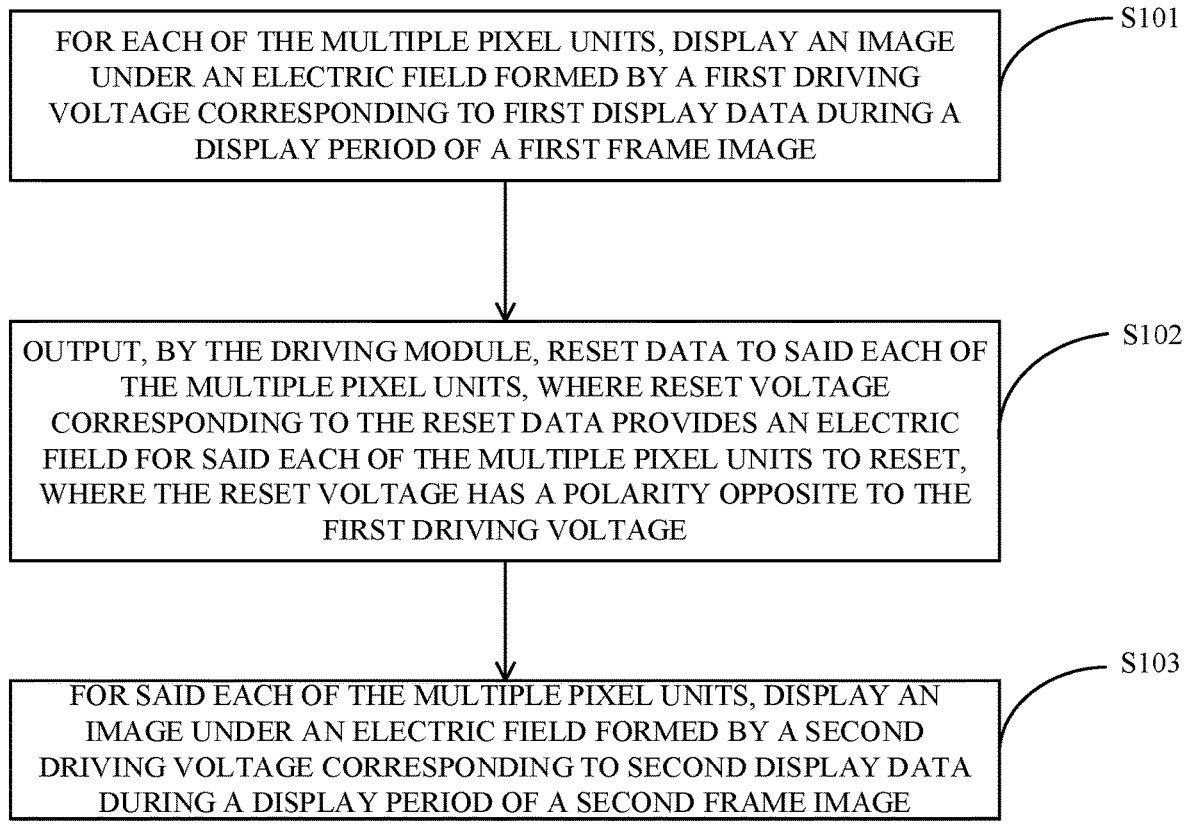
FIG. 6 is a flowchart illustrating an image display method provided in implementations of the present disclosure.

Reference can be made to FIG. 6, which is a flowchart illustrating an image display method provided in implementations of the present disclosure. The image display method includes the following.

At S101, for each of the multiple pixel units, an image is displayed under an electric field defined by a first driving voltage corresponding to first display data during a display period of a first frame image.

Specifically, the driving unit 60 outputs the first display data to pixel unit P. Under driving of the first driving voltage corresponding to the first display data, the electric field is defined between the pixel electrode 21 and the common electrode 23 (FIG. 3) to control the display panel 1 to display the first frame image.

At S102, reset data is output by the driving module to said each of the multiple pixel units. A reset voltage corresponding to the reset data provides an electric field for said each of the multiple pixel units to reset. The reset voltage has a polarity opposite to the first driving voltage.

Specifically, the driving unit 60 records the first display data, and determines grayscale changes of the micro liquid capsule 22A in pixel unit P according to second display data corresponding to a second frame image to be displayed. Specifically, the grayscale changes of the pixel unit P may include four cases, that is, from black to white, from black to black, from white to black, and from white to white.

Figure 7:
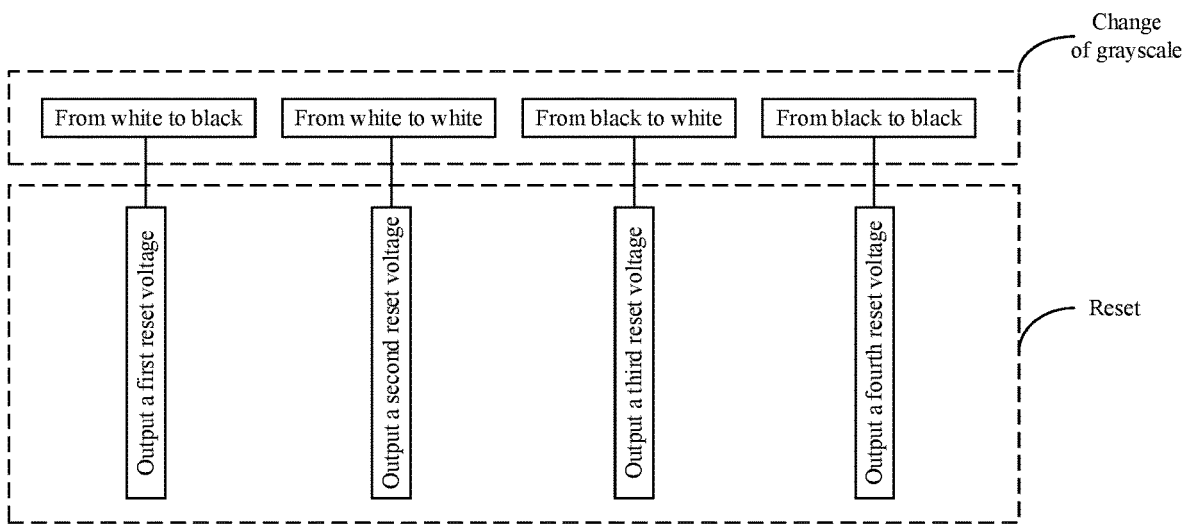
FIG. 7 is a schematic diagram illustrating a reset process of a pixel unit.

More specifically, reference can be made to FIG. 7, which is a schematic diagram illustrating a reset process of pixel unit P. As illustrated in FIG. 7, in one case, the grayscale of the micro liquid capsule 22A in pixel unit P changes from white to black. In other words, the micro liquid capsule 22A in pixel unit P displays a grayscale of white under the control of the first driving voltage corresponding to the first display data, and the first driving voltage is greater than 0 and is less than or equal to second voltage V2.

The micro liquid capsule 22A in pixel unit P displays the grayscale of black under the control of the second driving voltage corresponding to the second display data to-be-output.

Here, just before the second frame image is refreshed, the driving unit 60 outputs first reset voltage VR1 to control the micro liquid capsule 22A in pixel unit P to display the grayscale changing from a white grayscale section to a black grayscale section, that is, to a section ranging from 0 to first threshold grayscale M (FIG. 5). First reset voltage VR1 is less than first voltage V1 and greater than 0. A grayscale of the micro liquid capsule 22A corresponding to the first driving voltage is white, and a grayscale of the micro liquid capsule 22A corresponding to first reset voltage VR1 is black. In other words, a direction of an electric field corresponding to the first driving voltage and acting at two ends of the micro liquid capsule 22A is opposite to a direction of an electric field corresponding to first reset voltage VR1 and acting at the two ends of the micro liquid capsule 22A, and a polarity of the first driving voltage is opposite to a polarity of first reset voltage VR1.

In one case, the grayscale of the micro liquid capsule 22A in pixel unit P changes from white to white. In other words, the micro liquid capsule 22A in pixel unit P displays the grayscale of white under the control of the first driving voltage corresponding to the first display data.

The micro liquid capsule 22A in pixel unit P also displays the grayscale of white under the control of the second driving voltage corresponding to the second display data to-be-output.

Here, just before the second frame image is refreshed, the driving unit 60 outputs second reset voltage VR2 to control the micro liquid capsule 22A in pixel unit P to display the grayscale changing from white to maximum-grayscale black, that is, to first threshold grayscale M. Second reset voltage VR2 is equal to first voltage V1. The grayscale of the micro liquid capsule 22A corresponding to the first driving voltage is white, and the grayscale of the micro liquid capsule 22A corresponding to second reset voltage VR2 is black. In other words, the direction of the electric field corresponding to the first driving voltage and acting on the two ends of the micro liquid capsule 22A is opposite to the direction of the electric field corresponding to second reset voltage VR2 and acting at the two ends of the micro liquid capsule 22A, and the polarity of the first driving voltage is opposite to the polarity of second reset voltage VR2.

In one case, the grayscale of the micro liquid capsule 22A in pixel unit P changes from black to white. In other words, the micro liquid capsule 22A in pixel unit P displays the grayscale of black under the control of the first driving voltage corresponding to the first display data, and the first driving voltage is greater than 0 and less than first voltage V1.

The micro liquid capsule 22A in pixel unit P displays the grayscale of white under the control of the second driving voltage corresponding to the second display data to-be-output.

Here, just before the second frame image is refreshed, the driving unit 60 outputs third reset voltage VR3 to control the micro liquid capsule 22A in pixel unit P to display the grayscale changing from the black grayscale section to the white grayscale section, that is, to a section ranging from 0 to second threshold grayscale N (FIG. 5). Third reset voltage VR3 is less than second voltage V2 and greater than 0. The grayscale of the micro liquid capsule 22A corresponding to the first driving voltage is black, and the grayscale of the micro liquid capsule 22A corresponding to third reset voltage VR3 is white. In other words, the direction of the electric field corresponding to the first driving voltage and acting at the two ends of the micro liquid capsule 22A is opposite to the direction of the electric field corresponding to third reset voltage VR3 and acting at the two ends of the micro liquid capsule 22A, and the polarity of the first driving voltage is opposite to the polarity of third reset voltage VR3.

In one case, the grayscale of the micro liquid capsule 22A in pixel unit P changes from black to black. In other words, the micro liquid capsule 22A in pixel unit P displays the grayscale of black under the control of the first driving voltage corresponding to the first display data.

The micro liquid capsule 22A in pixel unit P also displays the grayscale of black under the control of the second driving voltage corresponding to the second display data to-be-output.

Here, just before the second frame image is refreshed, the driving unit 60 outputs fourth reset voltage VR4 to control the micro liquid capsule 22A in pixel unit P displays the grayscale changing from black to maximum-grayscale white, that is, to second threshold grayscale N. Fourth reset voltage VR4 is equal to second voltage V2. The grayscale of the micro liquid capsule 22A corresponding to the first driving voltage is black, and the grayscale of the micro liquid capsule 22A corresponding to fourth reset voltage VR4 is white. In other words, the direction of the electric field corresponding to the first driving voltage and acting at the two ends of the micro liquid capsule 22A is opposite to the direction of the electric field corresponding to fourth reset voltage VR4 and acting at the two ends of the micro liquid capsule 22A, and the polarity of the first driving voltage is opposite to the polarity of fourth reset voltage VR4.

At S103, for said each of the multiple pixel units, an image is displayed under an electric field defined by a second driving voltage corresponding to second display data during a display period of a second frame image.

Specifically, after pixel unit P is reset, the driving unit 60 outputs the second display data to pixel unit P. Under driving of the second driving voltage corresponding to the second display data, the electric field is defined between the pixel electrode 21 and the common electrode 23 (FIG. 3) to control the display panel 1 to display the second frame image. A reset process and a display process of the second frame image are consecutive display processes during which a driving voltage always exists.

Figure 8:
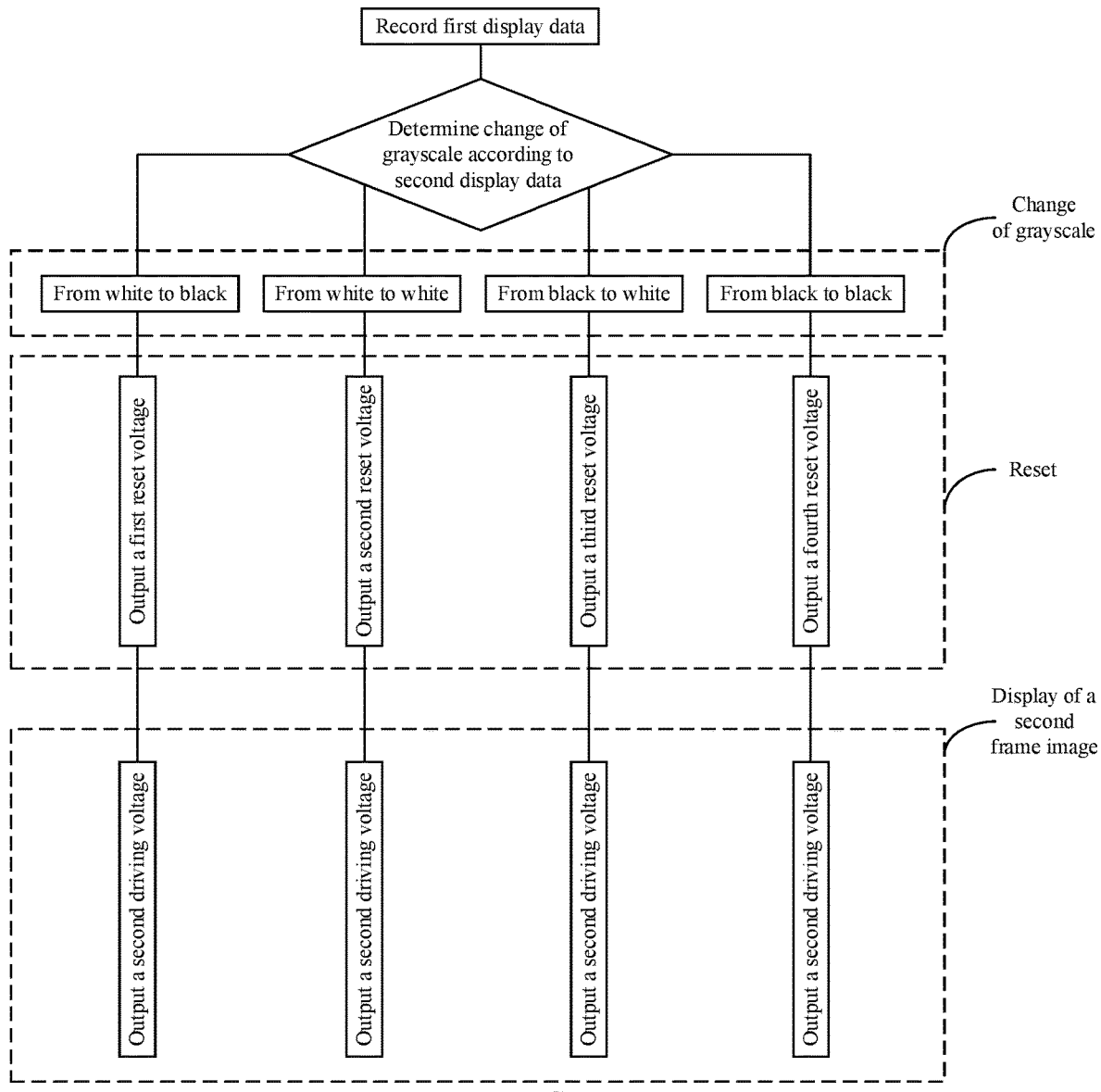
FIG. 8 is a schematic diagram illustrating a whole process of an image display method in implementations of the present disclosure.

Reference can be made to FIG. 8, which is a schematic diagram illustrating a whole process of an image display method in implementations of the present disclosure. As illustrated in FIG. 8, any one pixel unit P is taken as an example, when the first frame image is refreshed, the driving unit 60 records the first display data corresponding to the first frame image.

When the micro liquid capsule 22A in pixel unit P displays the grayscale of white under the control of the first driving voltage corresponding to the first display data, the grayscale of the micro liquid capsule 22A changes following curve 1 (FIG. 5), and the micro liquid capsule 22A becomes white. When image refresh is completed and a voltage across the micro liquid capsule 22A is removed, the grayscale of the micro liquid capsule 22A is stable at second stable grayscale K.

Before the second frame image is refreshed, the driving unit 60 determines a change of the grayscale of the micro liquid capsule 22A according to the second display data corresponding to the second frame image when the first frame image changes to the second frame image.

In one case, the grayscale of the second frame image corresponding to the micro liquid capsule 22A in pixel unit P is black. In other words, in two frames of image consecutively refreshed, the micro liquid capsule 22A in pixel unit P changes from white to black. Here, the driving unit 60 outputs first reset voltage VR1 to reset the grayscale of the micro liquid capsule 22A, such that the micro liquid capsule 22A is controlled to display the grayscale changing from second stable grayscale K to the black grayscale section, that is, to the section ranging from 0 to first threshold grayscale M.

When the second frame image is refreshed, the driving unit 60 controls the pixel electrode 21 to output the second driving voltage. The second driving voltage is greater than 0 and less than or equal to V1. The micro liquid capsule 22A displays the grayscale from a reset grayscale to a corresponding grayscale of black following curve 2 (FIG. 5).

When the micro liquid capsule 22A in pixel unit P displays the grayscale of white under the control of the first driving voltage corresponding to the first display data, the grayscale of the micro liquid capsule 22A changes following curve 1 (FIG. 5), and the grayscale of the micro liquid capsule 22A becomes white. When the image refresh is completed and the voltage across the micro liquid capsule 22A is removed, the grayscale of the micro liquid capsule 22A is stable at second stable grayscale K.

Before the second frame image is refreshed, the driving unit 60 determines the change of the grayscale of the micro liquid capsule 22A according to the second display data corresponding to the second frame image when the first frame image changes to the second frame image.

In one case, the grayscale of the second frame image corresponding to the micro liquid capsule 22A in pixel unit P is white. In other words, in two frames of image consecutively refreshed, the micro liquid capsule 22A in pixel unit P changes from white to white. Here, the driving unit 60 outputs second reset voltage VR2 to reset the grayscale of the micro liquid capsule 22A, such that the micro liquid capsule 22A is controlled to display the grayscale changing from second stable grayscale K to the maximum-grayscale black, that is, to first threshold grayscale M.

When the second frame image is refreshed, the driving unit 60 controls the pixel electrode 21 to output the second driving voltage. The second driving voltage is greater than 0 and less than or equal to V2. The micro liquid capsule 22A displays the grayscale from reset first threshold grayscale M to a corresponding grayscale of white following curve 1 (FIG. 5).

When the micro liquid capsule 22A in pixel unit P displays the grayscale of black under the control of the first driving voltage corresponding to the first display data, the grayscale of the micro liquid capsule 22A changes following curve 2 (FIG. 5), and the grayscale of the micro liquid capsule 22A becomes black. When the image refresh is completed and the voltage across the micro liquid capsule 22A is removed, the grayscale of the micro liquid capsule 22A is stable at first stable grayscale T.

Before the second frame image is refreshed, the driving unit 60 determines the change of the grayscale of the micro liquid capsule 22A according to the second display data corresponding to the second frame image when the first frame image changes to the second frame image.

In one case, the grayscale of the second frame image corresponding to the micro liquid capsule 22A in pixel unit P is white. In other words, in two frames of image consecutively refreshed, the micro liquid capsule 22A in pixel unit P changes from black to white. Here, the driving unit 60 outputs third reset voltage VR3 to reset the grayscale of the micro liquid capsule 22A, such that the grayscale of the micro liquid capsule 22A is controlled to display the grayscale changing from first stable grayscale T to the white grayscale section, that is, to the section ranging from 0 to second threshold grayscale N.

When the second frame image is refreshed, the driving unit 60 controls the pixel electrode 21 to output the second driving voltage. The second driving voltage is greater than 0 and less than or equal to V2. The micro liquid capsule 22A displays the grayscale from the reset grayscale to a corresponding grayscale of white following curve 1 (FIG. 5).

When the micro liquid capsule 22A in pixel unit P displays the grayscale of black under the control of the first driving voltage corresponding to the first display data, the grayscale of the micro liquid capsule 22A changes following curve 2 (FIG. 5), the driving unit 60 controls the pixel electrode 21 to output first voltage V1, and the grayscale of the micro liquid capsule 22A becomes black. When the image refresh is completed and the voltage across the micro liquid capsule 22A is removed, the grayscale of the micro liquid capsule 22A is stable at first stable grayscale T.

Before the second frame image is refreshed, the driving unit 60 determines the change of the grayscale of the micro liquid capsule 22A according to the second display data corresponding to the second frame image when the first frame image changes to the second frame image.

In one case, the grayscale of the second frame image corresponding to the micro liquid capsule 22A in pixel unit P is black. In other words, in two frames of image consecutively refreshed, the micro liquid capsule 22A in pixel unit P changes from black to black. Here, the driving unit 60 outputs fourth reset voltage VR4 to reset the grayscale of the micro liquid capsule 22A, such that the micro liquid capsule 22A is controlled to display the grayscale changing from first stable grayscale T to maximum-grayscale white, that is, to second threshold grayscale N.

When the second frame image is refreshed, the driving unit 60 controls the pixel electrode 21 to output the second driving voltage. The second driving voltage is greater than 0 and less than or equal to V1. The micro liquid capsule 22A displays the grayscale from reset second threshold grayscale N to a corresponding grayscale of black following curve 2 (FIG. 5).

Refresh conditions of two consecutive frames of image are classified according to the curve of the electrical ink gray changing along with the voltage, and different reset voltages are output selectively according to different image refresh conditions, such that the afterimage phenomenon caused by the hysteresis effect is effectively solved.

It should be understood that the application of the present invention is not limited to the examples described above and that modifications or modifications may be made in accordance with the above description to those of ordinary skill in the art, all of which fall within the scope of the appended claims of the present invention.

What is claimed is:

1. An image display method, applicable to a display panel and a driving module, wherein the display panel comprises a plurality of pixel units, each of the plurality of pixel units comprises at least one micro liquid capsule, each of the at least one micro liquid capsule displays a black-and-white grayscale under an action of an electric field, the driving module is coupled with the plurality of pixel units and provides a driving voltage according to display data to define the electric field to display an image, the display panel comprises a substrate, an electronic paper film sheet, a sealant, a Thin Film Transistor (TFT) trace layer, and a support, the substrate is stacked at one side of the support, the TFT trace layer is stacked at one side of the substrate away from the support, the electronic paper film sheet is stacked at one side of the TFT trace layer away from the substrate, and the sealant is disposed at an edge of the electronic paper film sheet; and the method comprises:

for said each of the plurality of pixel units, displaying an image under an electric field defined by a first driving voltage corresponding to first display data during a display period of a first frame image;

outputting, by the driving module, reset data to said each of the plurality of pixel units after the first frame image is displayed, wherein a reset voltage corresponding to the reset data provides an electric field for said each of the plurality of pixel units to reset, wherein the reset voltage has a polarity opposite to the first driving voltage;

for said each of the plurality of pixel units, displaying an image under an electric field defined by a second driving voltage corresponding to second display data during a display period of a second frame image.

2. The image display method of claim 1, comprising:
determining and comparing, by the driving module, a color of the first display data and a color of the second display data, and adjusting, by the driving module, a polarity of the reset voltage according to a comparison result.

3. The image display method of claim 2, comprising:
outputting, by the driving module, the reset voltage with a negative polarity, wherein said each of the plurality of pixel units is driven by the electric field defined by the first driving voltage to display white.

4. The image display method of claim 3, comprising:
outputting, by the driving module, a first reset voltage of the reset voltage, wherein said each of the plurality of pixel units is driven by the electric field defined by the first driving voltage to display white, and said each of the plurality of pixel units is driven by the electric field defined by the second driving voltage corresponding to the second display data to display black, wherein the at least one micro liquid capsule in said each of the plurality of pixel units is driven by an electric field defined by the first reset voltage to display a grayscale ranging from zero grayscale to a first threshold grayscale, and the first threshold grayscale is a highest grayscale for displaying black.

5. The image display method of claim 4, comprising:
outputting, by the driving module, a second reset voltage of the reset voltage, wherein said each of the plurality of pixel units is driven by the electric field defined by the first driving voltage to display white, and said each of the plurality of pixel units is driven by the electric field defined by the second driving voltage corresponding to the second display data to display white, wherein the at least one micro liquid capsule in said each of the plurality of pixel units is driven by an electric field defined by the second reset voltage to display a grayscale of the first threshold grayscale.

6. The image display method of claim 4, comprising:
outputting, by the driving module, a fourth reset voltage of the reset voltage, wherein said each of the plurality of pixel units is driven by the electric field defined by the first driving voltage to display black, and said each of the plurality of pixel units is driven by the electric field defined by the second driving voltage corresponding to the second display data to display black, wherein the at least one micro liquid capsule in said each of the plurality of pixel units is driven by an electric field defined by the fourth reset voltage to display a grayscale of the second threshold grayscale.

7. The image display method of claim 3, comprising:
outputting, by the driving module, a third reset voltage of the reset voltage, wherein said each of the plurality of pixel units is driven by the electric field defined by the first driving voltage to display black, and said each of the plurality of pixel units is driven by the electric field defined by the second driving voltage corresponding to the second display data to display white, wherein the at least one micro liquid capsule in said each of the plurality of pixel units is driven by an electric field defined by the third reset voltage to display a grayscale ranging from zero grayscale to a second threshold grayscale, and the second threshold grayscale is a highest grayscale for displaying white.

8. The image display method of claim 2, comprising:
outputting, by the driving module, the reset voltage with a positive polarity, wherein said each of the plurality of pixel units is driven by the electric field defined by the first driving voltage to display black.

9. The image display method of claim 1, wherein a direction of the electric field defined by the first driving voltage for said each of the plurality of pixel units is opposite to a direction of the electric field defined by the reset voltage for said each of the plurality of pixel units.

10. A display device, comprising:
a display panel comprising a plurality of pixel units, wherein each of the plurality of pixel units comprises at least one micro liquid capsule, and said each of the plurality of pixel units is configured to display a black-and-white grayscale under an action of an electric field, wherein said each of the plurality of pixel units is configured to display an image under an electric field defined by a first driving voltage corresponding to first display data during a display period of a first frame image, and display an image under an electric field defined by a second driving voltage corresponding to second display data during a display period of a second frame image; and wherein the display panel comprises a substrate, an electronic paper film sheet, a sealant, a Thin Film Transistor (TFT) trace layer, and a support, the substrate is stacked at one side of the support, the TFT trace layer is stacked at one side of the substrate away from the support, the electronic paper film sheet is stacked at one side of the TFT trace layer away from the substrate, and the sealant is disposed at an edge of the electronic paper film sheet; and a driving module coupled with the plurality of pixel units, wherein the driving module is configured to provide a driving voltage according to display data to define the electric field to display an image, and output reset data to said each of the plurality of pixel units after the first frame image is displayed, wherein a reset voltage corresponding to the reset data provides an electric field for said each of the plurality of pixel units to reset, wherein the reset voltage has a polarity opposite to the first driving voltage.

11. The display device of claim 10, wherein the driving module is configured to determine and compare a color of the first display data and a color of the second display data, and adjust a polarity of the reset voltage according to a comparison result.

12. The display device of claim 11, wherein the driving module is configured to output the reset voltage with a negative polarity, wherein said each of the plurality of pixel units is driven by the electric field defined by the first driving voltage to display white.

13. The display device of claim 12, wherein the driving module is configured to output a first reset voltage of the reset voltage, wherein said each of the plurality of pixel units is driven by the electric field defined by the first driving voltage to display white, and said each of the plurality of pixel units is driven by the electric field defined by the second driving voltage corresponding to the second display data to display black, wherein the at least one micro liquid capsule in said each of the plurality of pixel units is driven by an electric field defined by the first reset voltage to display a grayscale ranging from zero grayscale to a first threshold grayscale, and the first threshold grayscale is a highest grayscale for displaying black.

14. The display device of claim 13, wherein the driving module is configured to output a second reset voltage of the reset voltage, wherein said each of the plurality of pixel units is driven by the electric field defined by the first driving voltage to display white, and said each of the plurality of pixel units is driven by the electric field defined by the second driving voltage corresponding to the second display data to display white, wherein the at least one micro liquid capsule in said each of the plurality of pixel units is driven by an electric field defined by the second reset voltage to display a grayscale of the first threshold grayscale.

15. The display device of claim 11, wherein the driving module is configured to output the reset voltage with a positive polarity, wherein said each of the plurality of pixel units is driven by the electric field defined by the first driving voltage to display black.

16. The display device of claim 15, wherein the driving module is configured to output a third reset voltage of the reset voltage, wherein said each of the plurality of pixel units is driven by the electric field defined by the first driving voltage to display black, and said each of the plurality of pixel units is driven by the electric field defined by the second driving voltage corresponding to the second display data to display white, wherein the at least one micro liquid capsule in said each of the plurality of pixel units is driven by an electric field defined by the third reset voltage to display a grayscale ranging from zero grayscale to a second threshold grayscale, and the second threshold grayscale is a highest grayscale for displaying white.

17. The display device of claim 16, wherein the driving module is configured to output a fourth reset voltage of the reset voltage, wherein said each of the plurality of pixel units is driven by the electric field defined by the first driving voltage to display black, and said each of the plurality of pixel units is driven by the electric field defined by the second driving voltage corresponding to the second display data to display black, wherein the at least one micro liquid capsule in said each of the plurality of pixel units is driven by an electric field defined by the fourth reset voltage to display a grayscale of the second threshold grayscale.

18. The display device of claim 10, wherein a direction of the electric field defined by the first driving voltage for said each of the plurality of pixel units is opposite to a direction of the electric field defined by the reset voltage for said each of the plurality of pixel units.

19. The display device of claim 10, wherein the electronic paper film sheet comprises a pixel electrode, an electronic ink, and a common electrode, the pixel electrode is stacked at said one side of the TFT trace layer away from the substrate, the common electrode is disposed at a distance from one side of the pixel electrode away from the TFT trace layer, and the electronic ink is filled between the common electrode and the pixel electrode.

* * * * *